3,037,019
PHARMACOLOGICALLY ACTIVE COMPOUNDS
Emilio Testa, Luigi Fontanella, and Giulio Maffii, Milan, Italy, assignors to Lepitit S.p.A., Milan, Italy
No Drawing. Filed Dec. 18, 1959, Ser. No. 860,325
Claims priority, application Great Britain Dec. 23, 1958
7 Claims. (Cl. 260—239)

This invention is concerned with new pharmacologically active compounds. More particularly, the invention is concerned with new 1-acetylazetidines of the formula:

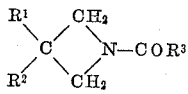

wherein $R^1$ represents hydrogen, lower alkyl, cycloalkyl, phenyl and phenylalkyl radicals, $R^2$ and $R^3$ represent lower alkyl, cycloalkyl, phenyl and phenylalkyl radicals.

The compounds of the invention are active as analgesic, antiepileptic and antispasmodic agents. Although these properties are common to the whole class of compounds of the above formula, the following have shown superior pharmacological properties. 1-propionyl-3-phenyl-3-ethylazetidine, intraperitoneally administered in rats, shows an average effective dose ($ED_{50}$) of about 20 mg./kg. protecting animals from electroshock induced seizures. The corresponding $ED_{50}$ of 1-valeryl-3-phenyl-3-ethylazetidine is of about 15 mg./kg. and that of 1-propionyl-3-phenyl-3-benzylazetidine is of about 10 mg./kg. Moreover the first of the above compounds shows an analgesic activity higher than that of D-propoxyphene. As already stated, the other members of this series show though in a somewhat minor degree, the same pharmacological properties.

The process of the invention consists in reacting a 3-substituted azetidine of the formula

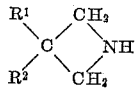

wherein $R^1$ and $R^2$ have the above significance, with the chloride or the anhydride of a carboxylic acid of the formula $R^3$—COOH, wherein $R^3$ has the above significance, if desired in the presence of a tertiary aminic base, at a temperature of 0°–120° C. The product is then isolated by conventional methods: for instance, the reaction mixture is dissolved in water and, depending upon the selected acylating agent, acidified with a mineral acid or treated with an alkali metal hydroxide or carbonate to slightly acidic reaction, extracted with an appropriate water insoluble organic solvent; the solvent is removed and the residue distilled or recrystallized from an appropriate solvent.

The starting materials, i.e., the 3-substituted azetidines, are prepared by bringing together a 2-azetidinone of the formula

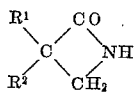

with lithium aluminium hydride in a molar ratio of 1 to about 0.8–1.5 in an anhydrous inert organic solvent such as diethylether or tetrahydrofuran, as described in our copending application Serial No. 860,311, filed simultaneously herewith.

The 2-azetidinones may be prepared as described in the following publications: E. Testa and Fontanella: Liebigs Ann. Chem., 625, 95–98 (1959); E. Testa and Fontanella: Liebigs Ann. Chem. 614, 167–170 (1958); E. Testa, Fontanella and Fava: Farmaco, 13, 152–162 (1958); and Fontanella and Testa; Liebigs Ann. Chem., 622, 117–120 (1959).

The following examples are illustrative of the invention.

EXAMPLE 1
*1-Acetyl-3-Ethyl-3-Phenylazetidine*

To a solution of 32.2 g. of 3-ethyl-3-phenylazetidine 8 g. of acetylchloride are slowly added with cooling. After 30 minutes at about 0° and one hour at room temperature the mixture is poured into 100 ml. of ice-water and extracted with diethyl ether. After evaporation of the ether, the residue is distilled collected at 160–170° C./0.4 mm. Yield 29 g. (71%).

EXAMPLE 2
*1-Acetyl-3-Ethyl-3-Phenylazetidine*

A mixture of 32.2 g. of 3-ethyl-3-phenylazetidine and 50 ml. of trimethylamine is slowly mixed with cooling with 50 ml. of acetyl chloride. After 10 minutes at 0–5° C. and 30 minutes at room temperature the reaction mixture is poured into 100 ml. of ice-water, acidified with 10% hydrochloric acid to pH 1 and extracted with diethyl ether. The extract is treated as described in the preceding example. Yield 27.5 g. (67%).

EXAMPLE 3
*1-Acetyl-3,3-Di-n-Propylazetidine*

A mixture of 46 g. of 3,3-di-n-propylazetidine and 140 ml. of acetic anhydride is heated one hour at 110–115° C. With stirring the hot reaction mixture is slowly poured into 350 ml. of water previously heated at 60° C. After cooling the mixture is neutralised to pH 6 by the addition of sodium carbonate (saturated solution) and extracted with diethyl ether. After separation of the solvent the residue is distilled and collected at 96–100° C./0.4 mm. Yield 44 g. (73%).

EXAMPLE 4
*1-Propionyl-3-Phenyl-3-Ethylazetidine*

To a solution of 32.2 g. of 3-ethyl-3-phenylazetidine 9 g. of propionyl chloride are slowly added under cooling. After 15 minutes at about 0° and half an hour at room temperature the reaction mixture is poured into 100 ml. of ice-water and extracted with diethyl ether. The solvent is evaporated and the residue distilled collecting at 130/150° C./0.6 mm. Yield 35 g. (80%).

EXAMPLE 5
*1-Butyryl-3-Phenyl-3-Ethylazetidine*

A mixture of 32.2 g. of 3-ethyl-3-phenylazetidine and 50 ml. of triethylamine is slowly mixed with cooling with 65 ml. of butyryl chloride. After 20 minutes at 0–5° C. and one hour at room temperature the mixture is poured into 150 ml. of ice-water, acidified with 10% hydrochloric acid to pH 1 and extracted with diethyl ether. The extract is evaporated and the residue distilled and collected at 140° C./0.2. Yield 40 g. (86%).

EXAMPLES 6 TO 12

According to the process of the preceding examples the following azetidines are prepared. Yields, boiling and melting points are given.

| Compound | Yield | B.P./M.P. |
|---|---|---|
| 1-valeryl-3-phenyl-3-ethyl | y. 73% | B.P. 150° C./0.5. |
| 1-isovaleryl-3-phenyl-3-ethyl | y. 81% | B.P. 145–150° C./0.5. |
| 1-tert.-valeryl-3-phenyl-3-ethyl | y. 66% | B.P. 140° C./0.4, M.P. 72–74° C. |
| 1-benzyl-3-phenyl-3-ethyl | y. 55% | B.P. 190–195° C./0.5. |
| 1-phenylethyl-3-phenyl-3-ethyl | y. 45% | B.P. 180–190° C./0.3. |
| 1-benzoyl-3-phenyl-3-ethyl | y. 25% | M.P. 63–64° C. |
| 1-propionyl-3-phenyl | y. 80% | B.P. 125° C./0.6. |

EXAMPLE 13

1-Propionyl-3-Phenyl-3-Methylazetidine

A mixture of 29.4 g. of 3-phenyl-3-methylazetidine and 150 ml. of propionic acid anhydride is heated 2 hours at 100–110°. The still warm reaction mixture is slowly poured with stirring into 300 ml. of water. After cooling the solution is neutralized to pH 6 with a saturated solution of sodium carbonate. The solvent is separated and the residue distilled; B.P. 150–160° C./0.4 mm. Yield 29 g. (71%).

EXAMPLES 14 TO 22

According to the process described in the preceding Example 13 the following azetidines are prepared. Yields, boiling and melting points are given.

| | |
|---|---|
| 1-acetyl-3-phenyl-3-methyl, y. 55% | B.P. 135–140° C./0.4. |
| 1-propionyl-3-phenyl-3-propyl, y. 56% | B.P. 135–145° C./0.2. |
| 1-acetyl-3-phenyl-3-butyl, y. 42% | B.P. 155–165° C./0.2. |
| 1-acetyl-3-phenyl-3-benzyl, y. 65% | M.P. 115–117° C. |
| 1-propionyl-3-phenyl-3-benzyl, y. 45% | M.P. 79–80° C. |
| 1-acetyl-3,3-dimethyl, y. 70% | B.P. 80–90° C./15. |
| 1-acetyl-3,3-diethyl, y. 75% | B.P. 85–90° C./0.4. |
| 1-propionyl-3,3-diethyl, y. 55% | B.P. 85–89° C./0.2. |
| 1-acetyl-3,3-dibutyl, y. 75% | B.P. 108–110° C./0.4. |

We claim:
1. A 3-substituted azetidine of the formula

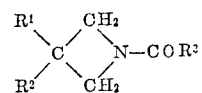

wherein $R^1$ is a member of the class consisting of hydrogen, lower alkyl, cyclohexyl phenyl and phenyl-lower alkyl, $R^2$ and $R^3$ are members of the class consisting of lower alkyl, cyclohexyl, phenyl and phenyl-lower alkyl.
2. 1-propionyl-3-phenyl-3-ethylazetidine.
3. 1-valeryl-3-phenyl-3-ethylazetidine.
4. 1-propionyl-3-phenyl-3-benzylazetidine.
5. 1-acetyl-3-phenyl-3-ethylazetidine.
6. 1-acetyl-3,3-di-n-propylazetidine.
7. 1-propionyl-3-phenylazetidine.

References Cited in the file of this patent

Noller: Textbook of Organic Chemistry, W. B. Sanders Co., Philadelphia, Pa. (1958), page 190.